ABSTRACT## United States Patent [19]

Lee et al.

[11] Patent Number: 4,675,201
[45] Date of Patent: Jun. 23, 1987

[54] PROTEIN COMPOSITION CHARACTERIZED BY LOWER THERMOGELATION TEMPERATURE AND IMPROVED ACID SOLUBILITY

[75] Inventors: Chang R. Lee, Yonkers; Pei K. Chang, Montrose, both of N.Y.

[73] Assignee: Ciba Corning Diagnostics Corp., Medfield, Mass.

[21] Appl. No.: 187,352

[22] Filed: Sep. 24, 1980

Related U.S. Application Data

[63] Continuation-in-part of Ser. No. 95,684, Nov. 19, 1979, abandoned.

[51] Int. Cl.$^4$ ............................ A23J 3/00; A23L 1/04
[52] U.S. Cl. ............................... 426/573; 426/614; 426/657
[58] Field of Search ............... 426/583, 614, 657, 656, 426/573

[56] References Cited

U.S. PATENT DOCUMENTS

| | | | |
|---|---|---|---|
| 2,123,203 | 7/1938 | Riggs et al. | 426/583 X |
| 3,143,427 | 8/1964 | Thies | 426/583 X |
| 3,397,991 | 8/1968 | Johnson et al. | 426/656 |
| 3,594,192 | 7/1971 | Mullen et al. | 426/656 X |
| 3,737,326 | 6/1973 | Basso et al. | 426/583 |
| 3,935,323 | 1/1976 | Feminella et al. | 426/583 X |
| 4,036,999 | 7/1977 | Grindstaff | 426/583 X |
| 4,091,120 | 5/1978 | Goodnight, Jr. et al. | 426/656 X |
| 4,166,142 | 8/1979 | Chang | 426/583 |
| 4,178,391 | 12/1979 | Chao et al. | 426/583 X |
| 4,200,662 | 4/1980 | Scibelli | 426/583 |
| 4,218,490 | 8/1980 | Phillips et al. | 426/657 X |

FOREIGN PATENT DOCUMENTS 2055846A 7/1979 United Kingdom .

*Primary Examiner*—Robert Yoncoskie
*Attorney, Agent, or Firm*—B. D. Voyce

[57] ABSTRACT

The thermogelation temperature of protein in a solution having a pH above the isoelectric point of the protein can be lowered within the range of the thermogelation temperature of egg albumen and an increase of stability of the protein in a solution having a pH below the isoelectric point of the protein by a process comprising cooling an ungelled heated protein-containing alkaline solution having a total protein content of less than about 20% wherein the pH of the solution is within the range of from about 7.5 to about 10 and the temperature is within the range of from about 50° C. up to the gelation temperature of the protein to a temperature sufficiently low and within a sufficient time after the solution reaches its maximum temperature level to prevent any substantial further change in the protein structure or gelation.

6 Claims, No Drawings

PROTEIN COMPOSITION CHARACTERIZED BY LOWER THERMOGELATION TEMPERATURE AND IMPROVED ACID SOLUBILITY

CROSS REFERENCE TO RELATED APPLICATION

This application is a continuation-in-part, of Ser. No. 95,684, filed Nov. 19, 1979, now abandoned.

BACKGROUND OF THE INVENTION

The present invention relates to a new protein composition and particularly a new whey protein composition characterized by improved acid solubility at a pH below the isoelectric point of the protein as well as a lower thermogelation temperature in solutions at a pH above the isoelectric point of the protein. The invention also relates to processes for preparing such products.

DESCRIPTION OF THE PRIOR ART

A significant by-product of the cheese manufacturing process is whey which contains 93.1% water, 0.9% protein, 4.5% lactose and some ash. Because of the ready availability of billions of gallons of whey and the need to reduce the biological oxygen demand caused by sewering this material, numerous processes have been proposed for separating the constituents of whey from the water. Lactose, which is the major constituent, has been separated by many methods designed to prevent protein contamination during the crystallization of the lactose. Many of these methods generally rendered the protein essentially useless for functional purposes. Much of the protein becomes a constituent of animal food. Any process which does effect a proper separation is usually complex.

In order for a complex separation process to be profitable, the whey protein is required to be sold for uses commanding a price higher than that for animal food. Due to the high selling price of egg white solids, various attempts have been made to utilize whey protein products as functional replacements for egg white solids. Most of these suggestions failed to provide a useful replacement. Egg white provides unique foaming as well as coagulation properties. Our experiments have shown that the aggregation of egg white, i.e., the increase in viscosity and change in color that precedes gelation, occurs at a temperature of about 62° C. using normal, fresh egg white (pH 9, total solids of 12% and 10.9% protein) after a minimum of about two minutes. Whey proteins do not aggregate or coagulate at that low temperature.

It is known that thermogelation of ovalbumin involves three steps:
(a) unfolding (denaturation) of protein molecules;
(b) thermal movement of unfolded protein molecules, and
(c) association reactions (mainly disulfide interchange) to form the gel network. (Factors Contributing to the Heat-Induced Aggregation of Ovalbumin, by. R. Nakamura et al., Agric. Biol. Chem. 42 (4), 819–824, 1978). It is known that certain whey proteins are generally more stable than egg white proteins thus requiring a greater temperature to achieve activation. During the transition from the ordered native state to a disordered, denatured state, proteins experience activated states which have a free energy that is higher than that of either the native or denatured state (Tanford, C., Protein Denaturation Part C, Theoretical Models for the Mechanism of Denaturation, pp. 1–95 in "Advances in Protein Chemistry", Vol. 24, 1970. Academic Press at page 4). Whey proteins are generally assumed to be more stable during the transition from native to denatured state. Thus, whey protein requires a higher temperature for thermogelation than egg albumen.

It was proposed in U.S. Pat. No. 1,787,754 to treat raw whey with 3–4% slaked lime while heating to precipitate the whey proteins. The precipitated proteins were said to function as whipping agents. However, it is also known that the addition of slaked lime to cheese whey results in a pH of substantially above 10, which, when combined with heating causes alkaline hydrolysis of the whey protein and development of off-flavor.

It is shown in U.S. Pat. No. 2,695,235 that whey protein can be treated to provide a material which coagulates in a manner similar to egg white at a temperature below 100° C. Concentrated whey is treated at a pH above about 9 to effect crystallization of the lactose. An impure lactose composition containing lactose, calcium salts, phosphates and a portion of the whey protein is separated by filtration. The filtrate is taught to form a coagulum upon heating similar to egg white particularly if the pH is reduced to a value between pH 6 and 8 prior to heating. No coagulation temperature has been disclosed other than below 100° C. The concept of reduction of the coagulation temperature is not disclosed. The method disclosed in U.S. Pat. No. 2,695,235 is basically a method for protein concentration. The mere treatment of whey protein at a pH within the range of from 9 to 11 will not decrease the coagulation temperature of the whey protein at a pH above the isoelectric point or improve the acid solubility at a pH below the isoelectric point.

It has been disclosed in a paper by D. E. Palmer entitled, "High Purity Protein Recovery, Process Biochemistry", Vol. 12 (No. 5) June 1977, pp. 24–28, that a whey protein concentrate prepared by ion exchange will coagulate at 60° C., i.e., approximately the same coagulation temperature as egg white. The paper discloses a process for separating whey protein from whey by contacting whey with a cellulosic cation exchange resin under acidic conditions to bind the protein followed by draining the liquid containing ash and lactose. The protein is recovered by washing the resin containing the protein with alkali. The protein contained in the eluate is concentrated by an ultrafiltration membrane and dried. Processing temperatures are not reported. The paper teaches that a lactose-free product having a low ash is obtained wherein the protein is soluble (remains in solution once solubilized) and undenatured (does not form substantial precipitate at isoelectric point). The product at 12% total solids (about 97% protein on a dry basis) formed a firm, stable gel as did egg white after heating at 60° C. for ten mintues. An ultrafiltered powder of milk whey at 15% total solids (60% protein, 30% lactose and 2–3% fat) was not affected by the same heat treatment (see Table IV at page 28).

The product described in the Palmer paper was evaluated by K. J. Burgess and J. Kelly. The results were presented in an article entitled, "Technical Note: Selected Functional Properties of a Whey Protein Isolate", J. Fd. Technology (1979) 14, 325–329 (copyright 1979 Blackwell Scientific Publication). In the article, the authors compared the thermogelation properties of the whey protein isolate of Palmer against egg white and a whey protein concentrate prepared by ultrafiltration. The reference states:

"Solubility at pH 4.5 is often used as a measure of denaturation in whey protein systems . . . and the low [35%] protein solubility of the whey protein isolate at this pH therefore suggests that the protein recovery process [Palmer] in some way altered the native structure of the whey protein. This may be explained by the alkaline (pH 9) conditions used in the recovery process. At this high pH, the repulsive forces within the protein molecules are large and cause the molecules to open up and unfold. Processing temperature (50° C. for the isolate studied) also affects this molecular unfolding since it has been shown that the protein solubility at pH 4.5 of whey protein isolate recovered at 20° C. is over 75% (Phillips, 1977 personal communication)." Material in brackets [] added.

While Palmer indicates that the product is undenatured, Burgess and Kelly specifically point out that the native structure of the isolated protein has probably been changed by the manufacturing process.

Burgess and Kelly teach that they are able to achieve a gelation temperature equivalent to or slightly lower than egg white using solutions of the whey protein isolate described by Palmer at 11% protein concentration. The Burgess and Kelly article shows that at an equivalent total protein basis and a dissimilar total solids basis, a change in the pH at the time of gelling will also have an effect on the gelation temperature. This apparently supports the contention that the whey protein isolate was partially unfolded at the time of gelation. The thermogelation temperature of an ultrafiltered whey protein concentrate solution at 11% protein or an 18% total solids was partially effected by pH, i.e., a reported temperature of 67° C. at pH 9. The paper reported that the ultrafiltered whey protein concentrate did not gel at the same temperature as that reported for egg white, i.e., 60° C. The paper does not define what is meant by gelation.

The thermogelation temperature of whey protein concentrate can be partially lowered chemically by the use of a sulfite (Protolac product brochure, Industrial Foods Products, Borden Foods, Division of Borden, Inc. at page 4). However, in addition to not lowering the gelation temperature to that of egg white, the use of sulfite adds a chemical to the product which may not be desired in the area of final use.

As an additional problem, the use of whey proteins to protein fortify acidic beverages has in some cases not been accepted because the proteins can show partial instability in acidic beverage systems (below pH 4.2) when subjected to pasteurization. The chance of instability, which is evidenced by a precipitate which settles upon standing, occurs frequently enough to cause manufacturers of protein fortified beverages to consider other protein sources.

None of these references discloses a convenient process for effecting the reduction of the thermogelation temperature of whey protein concentrate at a pH above the isoelectric point of the protein and provide an acid stable protein system at a pH below the isoelectric point of the protein.

THE INVENTION

It has been found that the thermrgelation temperature of a thermogelable protein to be defined hereinafter in a solution having a pH above the isoelectric point of the protein can be lowered within the range of the thermogelation temperature of egg albumen and the stability of the protein in a solution having a pH below the isoelectric point of the protein can be increased by a process comprising cooling an ungelled heated alkaline protein-containing solution having a total protein content ranging from about 0.5% to about 20% wherein the pH is within the range of from about 7.5 and preferably about 8 to about 10 from a temperature within the range of from about 50° C. up to the gelation temperature of the protein to a temperature sufficiently low and within a sufficient time after the solution reaches its maximum temperature level to prevent gelation of the protein containing solution. Preferably, the pH is reduced to neutral (6–7.5) simultaneously with or subsequent to cooling. A preferred form of the process of the present invention comprises the steps of:

(a) preparing a solution of whey protein in water at a temperature of less than about 30° C. at between 0.5% and 20% total protein content wherein the pH of the solution is within the range of from about 7.5 to about 10;

(b) heating the alkaline solution to a temperature within the range of from about 50° C. and 150° C., said heating being insufficient to gel the solution;

(c) cooling to a temperature below 30° C. and above 2° C. within at least about 60 minutes after reaching the elevated temperature at a rate sufficient to prevent any further substantial change in the protein structure; and (d) adjusting the pH below pH 7.5 and preferably within the range of from 6 to about 7.5. Cooling is generally initiated within one hour and preferably within 30 minutes after the temperature of the solution has reached its maximum level. Cooling is conducted at a rate sufficient to prevent any further substantial change in the protein and to avoid gelation of the protein containing solution.

DETAILED DESCRIPTION OF THE INVENTION

In theory, it is hypothesized that the present invention is based on the concept that partial unfolding of proteins such as whey proteins from the globular form to the random coil form might lower the free energy of activation, thus shifting the thermogelation temperature to a lower level. The partial unfolding might also expose hidden intramolecular sulfhydryl groups. The process of the invention lowers the level of the thermogelation temperature of whey protein while not denaturing the protein to a point of gelation. This is theory and applicant does not intend to be bound thereby.

As used herein, the term "thermogelation" is intended to mean the formation of a continuous network which exhibits a certain degree of order by heating. This is differentiated from aggregation which is a collective term for protein-protein interaction. Aggregation can include precipitation, coagulation and flocculation as well as gelation. The initiation of gelation can be observed when protein molecules begin to interact as evidenced by an increase in viscosity and change in colors. Further heating beyond the initial step of gelation can cause the protein to arrange in an ordered three dimensional network or gel.

The protein which can be treated in accordance with the present invention is protein which is capable of being thermogelled by the formation of disulfide interchange linkages and which is soluble at the alkaline pH of the process, i.e., between about pH 7.5 and about 10. As was stated previously, thermogelation involves unfolding of the protein molecules, thermal movement of unfolded protein molecules and association reactions (mainly disulfide interchanges) to form the gel network. Therefore, the material for thermogelation must contain sulfhydryl groups or groups which can form disulfide linkages. For example, alpha-lactalbumin has four disulfide linkages and no sulfhydryl groups per molecule. Betalactogloblin has one sulfhydryl group and two disulfide linkages per molecule. The type of gel which can be formed from any one protein depends on the availability of the sulfhydryl or disulfide groups for interaction in forming disulfide linkages. By thermogellable protein which can be processed in accordance with the invention is meant that protein which can form a stable gel (see definition of thermogelation on page 8) after heating a solution containing 5% protein for 30 minutes at 90° C.

The protein which can be treated in accordance with the present invention must be soluble at the alkaline pH of the process and preferably, also soluble at its isoelectric point. Protein which is insoluble at the alkaline pH cannot be made soluble by treatment in accordance with the process of the invention. While a protein system which contains protein which is soluble and insoluble can be treated, only the soluble protein will be affected. The insoluble protein generally will have no adverse affects on the protein during processing. However, the insoluble protein can affect the gel strength of later formed gels or precipitate in acidic beverages. It is preferable that the protein from the protein source be at least 50% soluble and preferably at least 100% soluble at the alkaline pH of the process and preferably at the isoelectric point to provide results which are not diluted by undesirable factors.

The protein for use in the present invention are defined as thermogelable dairy, vegetable, meat, and blood proteins and mixtures thereof, which are soluble in water at a pH of from about 7.5 to about 10 and preferably at their isoelectric point and which contain sulfhydryl groups or disulfide bondings. The water soluble dairy proteins are the whey proteins since the other major protein of milk is casein which is insoluble at its isoelectric point. The soluble vegetable proteins are the whey proteins left after isolation of protein by precipitation from soy, cottonseed, peanut and the like vegetables. Soluble meat proteins including soluble proteins from red meat, poultry and fish can also be used. Blood proteins such as blood albumins can also be processed in accordance with the process of the invention. The processing conditions must be adapted for each protein since the activation point (aggregation temperature) varies for each protein.

The protein can be any physical form as long as the criteria for the protein stated herein are met. The protein can be raw protein, processed, granular, powder, or solutions of proteins either natural or as a result of processing such as dairy whey or soy whey.

The preferred protein for use in the present invention is dairy whey protein. This protein can be derived from the rennet productions of cheese cheddar or sweet whey) or the acid production of cheese or casein (acid or cottage cheese whey). Cottage cheese whey proteins are preferred because of their bland flavor.

The dairy whey proteins can be provided by raw or concentrated whey or by whey proteins containing products such as clarified dairy whey (clarified by the processes of U.S. Pat. Nos. 3,560,219 or 4,036,999), demineralized whey, delactosed whey, delactosed demineralized whey, and the like. Preferably, the whey protein is used in the form of a whey protein concentrate (WPC) containing at least 30% and preferably from about 40% to 60% protein. Whey protein concentrates containing 100% and preferably about 90% protein can also be used but these are impractical from a commercial standpoint.

The whey protein concentrates can be prepared by any one of a number of known processes including electrodialysis (Stribley, R.C., Food Processing, Volume 24, No. 1, page 49, 1963), reverse osmosis, (Marshall, P.G. et al., Fractionation and Concentration of Whey by Reverse Osmosis, Food Technology, 22(a), 696, 1968), gel filtration (U.S. Pat. No. Re. 27,806); Ion Exchange (Palmer, ibid); or by ultrafiltration (Horton, B.S. et al., Food Technology, Volume 26, page 30, 1972). Chemical methods including the phosphate precipitation of whey protein can also be used as described in Gordon U.S. Pat. No. 2,388,624 and Melachouris U.S. Pat. No. 4,043,990. The disclosures of the foregoing articles and patents are incorporated herein by reference. The whey protein concentrate should contain at least 30% and preferably from about 40% to about 60% protein based on total Kjeldahl nitrogen. Processes which substantially denature the protein such as high heat, strong chemicals, electrodialysis under extreme conditions should be avoided.

It has been found that the most effective results are obtained using an ultrafiltered acid (cottage cheese) whey concentrate containing from about 40% to about 60% and preferably about 45% to about 55% whey protein. In a typical process, cottage cheese whey is neutralized to a pH of about 6.4 with 50% caustic. After storage, the pH is then adjusted to about 7.2 and any solids or precipitates are removed by centrifugal clarifiers. The clarified liquor is then pasteurized. The liquor is then fed into an ultrafiltration membrane unit. The retentate is condensed and spray dried. Protein products of 35% or more whey protein can be prepared by this process. Products generally comprising from about 40% to 60% protein (TKN×6.38), 10–30% lactose, 3–15% ash, and 0.1–4% fat are obtained. The dried retentate with the aforegiven composition is considered a whey protein concentrate. While the whey protein concentrate can be used in the dry form, the liquid form can also be used on a percent by weight solids basis. Liquid whey protein concentrate must be kept under refrigeration to prevent spoilage.

The protein in the whey protein concentrate must be substantially soluble under the alkaline pH conditions of the process. Excessive heating can decrease such solubility. Therefore, drying should be conducted under conditions which do not extensively reduce solubility. Low temperature drying methods such as freeze-drying and spray drying are preferred.

The whey protein containing solution to be treated in accordance with the process of the present invention does not require a minimum amount of protein for effective treatment. Thus, raw whey at a protein concentration of about 1% can be treated by the process of the present invention. Raw whey when dried provides a dried product with about 12% protein. It is preferred not to use a whey protein solution having more than 15% protein in solution since the conditions of the reaction tend to gel solutions with whey protein content greater than 15% before completion of the treatment.

Preferably, the protein solution contains less than 7% whey protein. These conditions are specific for whey proteins. The percentage of protein in the solution is intended to cover those proteins in the solution and not all proteins both soluble and insoluble in the aqueous system. Similar conditions exist for the other protein systems which can be treated in accordance with the invention and these limits can be easily determined by one skilled in the art.

As used herein, the percent protein is based on total Kjeldahl nitrogen. Percentage protein level in a whey protein product or concentrate is by weight based on the total dry weight of the product. The percentage protein of the solutions treated is by weight of the proteins in solution based on the total weight of the solution.

The protein containing solution can be obtained by using an existing protein solution or by dissolving protein source in water. To avoid possible calcium ion interaction, calcium free water or a calcium reduced protein solution is preferred. Calcium reduction in a whey solution can be accomplished by the methods disclosed in U.S. Pat. Nos. 3,560,219 and 4,036,999. The solution is preferably at room temperature (about 25° C.). Sufficient agitation in this portion of the process as well as the remainder of the process is preferred to avoid possible gelation due to the static positioning of reactive sites of the protein.

Subsequently, the pH is adjusted to an alkaline range of from about pH 7.5 to about pH 10, preferably from pH 8 and more preferably for whey proteins (dairy) from about pH 9 to about pH 10. Most effective results have been achieved with whey proteins (dairy) at about pH 9.5. Any food grade alkalizing agent which does not interfere with the final reaction product and/or its use can be used. Preferably, sodium and potassium hydroxide and more preferably sodium hydroxide are used. Calcium hydroxide, while being an effective alkalizing agent, is less preferred since calcium can cause protein cross-linking and, therefore, insolubilization. Other methods of elevating the pH can be used such as passing the protein system through an anionic/cationic exchange resin.

The alkalizing agent is added under conditions which will not cause localized pH elevations above about pH 10 to thereby avoid extensive protein denaturation. For instance, a weak (1 normal) sodium hydroxide solution can be added fairly rapidly under fast stirring without fear of a strong concentration of alkali building up in any one area. However, the use of a stronger alkaline solution is desired to avoid the necessity of removing excess water at the conclusion of the process if a dried product is desired. In such case, a stronger solution of alkali such as a 4 normal solution of alkali can be added but it must be added slowly and with fast stirring. It has been found that the addition of a 4 normal solution of alkalizing agent can be accomplished without incurring protein insolubilization in approximately ten minutes. These conditions can vary depending upon the strength of the alkalizing agent, the degree of stirring and the rate of addition. These factors would be obvious to one skilled in the art.

The alkaline whey protein solution is then heated to a temperature within the range from about 50° C. up to the gelation temperature of the protein for a time insufficient to cause gelation. The heating temperature preferably ranges from about 50° C. to about 150° C., more preferably 50° C. to about 95° C., and most preferably from about 50° C. to about 80° C. The temperature should be elevated as fast as possible without causing protein insolubilization by heat denaturation since long time heating is harmful to the protein molecules. The maximum heat time is the gelation point of the protein. The heating time should not be over a maximum of one hour and preferably less than 30 minutes and more preferably less than 15 minutes depending on the temperature of processing. The heating can be accomplished in a vessel with a heating means or other equivalent. In a dairy, high temperature short time pasteurization processing equipment can be effectively utilized. In the latter case, the temperature is elevated very rapidly, i.e., within 20 seconds without causing harm to the protein and this method is most preferred. Ultrahigh temperature pasteurization equipment using 145–150° C. for 4 to 2 seconds, respectively, can also be used providing the heating is at a rate which will not gel the protein. Low temperature long time conditions such as used in egg pasteurization can also be used, i.e., 57° C. for 3.8 minutes. The heating is conducted at a rate such that an improvement in gelation is obtained without gelling the solution. The alkali can be added to a heated solution or the alkalization and heating can be conducted simultaneously, particularly using a heating unit that will elevate the temperature rapidly.

After the alkalized whey protein solution has reached the maximum temperature level, cooling is preferably immediately applied to reduce the temperature of the solution below that at which further change in the protein structure occurs and preferably to room temperature. Adequate agitation is necessary to insure that cooling is uniform throughout the mass. The cooling rate and temperature are reative to the heating rate and temperature as well as the activation point of the protein so that the cooling retards further unfolding of the protein. Therefore, cooling must be initiated within one hour after the completion of the heating step and preferably in less than 15 minutes depending on the activation point of the protein and the temperature used. Protein structure changed by heating is halted or significantly retarded at a temperature below about 60° C. and preferably below about 30° C. The temperature should not be reduced below a temperature which will damage the protein or reduce the effects obtained by heating preferably not below about 2° C. At low temperatures, renaturation or folding of the protein is favored. The cooling is conducted as rapidly as convenient of the solution. With dairy whey proteins, the time is generally less than 1 hour, preferably less than ½ hour and more preferably less than 15 minutes and more preferably less than 5 minutes depending on the maximum temperature achieved during heating. The higher the temperature achieved, the greater is the required rate of cooling. For instance, effective results have been found by treating whey protein using a maximum temperature of from about 70° C. to about 75° C. In order to prevent gelation of the whey protein, the heat must be lowered rapidly to below at least about 60° C. within less than about one minute to prevent further change in the protein structure or initiate protein to protein interaction. Under these conditions, a high temperature short time pasteurization can effectively be used to heat the alkaline whey protein containing solution to a temperature within the range of from about 70° C. to about 75° C. and cool within a minute, preferably ½ minute.

Subsequent to cooling, the pH is adjusted to a range of about 6 to about 7.5 and preferably from about 6.5 to about 7.5 with any food grade acid. Strong acids can be used under fast stirring with slow addition and weaker acids can be used with less strenuous conditions as long as the conditions are such as to not to cause a localized acid buildup. It has been found that 4 normal hydrochloric acid can be added slowly under fast stirring over a period of about ten minutes. The use of a strong acid is favored in those situations where the product is dried since there is less water to be removed. The strength of the acid and its rate of addition are dependent on avoiding localized reductions in pH which may affect the protein as would be obvious to one skilled in the art.

Since the cooling step is conducted with rapid stirring, it is possible to adjust the pH during the cooling step. Acid addition can be initiated at the same time that the cooling is initiated or towards the end of the cooling period.

The neutralization step is important in preparing a dried product for general use. A partially alkaline product can also be prepared by not reducing the pH to neutrality prior to drying. Similarly, if a partially acidic product was desired, additional acid could be added to reduce the pH to the level desired.

The neutralized product can be used as is, concentrated and/or dried. If the liquid product is utilized, refrigeration must be maintained to avoid spoilage. Concentration or drying should be conducted under conditions which will not further substantially denature the product. Processes which effect a localized high heating of the product are to be avoided since the protein as treated has a lower coagulation temperature. Preferably, the product is concentrated by mechanical means such as gel filtration or ultrafiltration or by the use of freeze-drying, vacuum or spray drying. The preferred method of drying is spray drying.

Protein solutions containing two different protein sources can be treated simultaneously. Since each protein system may have its own level of stability, temperatures for effective processing of each type of protein may vary.

In general, processsing conditions for the protein with the lowest activity point should be used. Care must be taken to avoid conditions which will gel any of the protein.

It has also unexpectedly been found that some combinations of proteins can be processed together beneficially using the process of the invention. For instance, egg albumen (fresh, dried or frozen) and whey protein concentrate can be processed advantageously together. Blends of egg albumen and whey protein concentrate generally provide a mixture which has a lower gel strength than either of the two proteins gelled separately. The use of a whey protein concentrate modified in accordance with the invention partially increases the gel strength of the blend but not to the level of each protein separately. Surprisingly, the simultaneous treatment of a blend of egg albumen and, preferably, whey protein concentrate in accordance with the invention provides a solution which exhibits a gel strength at least comparable to egg albumen.

In forming blends for this surprising aspect of the invention, blends comprise from about 1% to about 99% and preferably from about 25% to about 75% egg albumen the remainder being another water soluble protein as defined hereinbefore. The solids content of the solution of the blend treated in accordance with the invention should not exceed about 30% and preferably less than 15% total solids. Maximum processing temperatures are preferably within the range of from about 50° C. to about 80° C. and more preferably from about 55° C. to about 75° C. Temperatures as high as 150° C. may also be usable if the heating time is kept short enough. Processing times are temperatures dependent, the higher the temperature, the shorter the processing time. The elapsed time that the blend is above 50° C. should not exceed one minute and preferably should not exceed 30 seconds. The most preferred protein is whey protein concentrate.

While it is well known to pasteurize egg whites by heating egg white at pH 9 to 56.7° C. for 3.5 minutes (Food Product Development, 4 (3), p. 28 at page 32), it is critical to control the temperature and the heating time for effective bacteria kill. The temperature of pasteurization has been found to be low. Stabilizers such as aluminum sulfate are added to increase the heating temperature which can be used before gelation. The use of whey protein concentrate in combination with the egg albumen apparently contributes stability to the egg albumen allowing for the use of a higher pasteurization temperature. Heat processing temperatures in the range of 70°-75° C. for short times can be used without gelling the egg albumen.

While other proteins soluble at the pH of processing could be included in the blend, it is preferred to use only a blend of whey protein concentrate and egg albumen. This product acts as a total or partial replacement for egg albumen in those areas where egg albumen finds utility.

Blends of two or more modified proteins can be prepared by processing each separately and blending the same together before or after drying.

In the product of the invention, at least 50% and more preferably at least 75% and most preferably 100% of the protein is modified protein preferably derived from dairy whey. The remaining protein can comprise blends of other proteins modified in accordance with the invention (in the preferred dairy whey embodiment), and/or other unmodified proteins. Such other unmodified proteins which can be added to the processed protein before (including reslurrying) or after drying (dry blend) include unmodified whey proteins including dry whey, delactosed whey, delactosed/demineralized whey where demineralization is accomplished by any known method transfer (ultrafiltration, reverse osmosis), the dried permeate and dried delactosed permeate resulting from the ultrafiltration of whey, the precipitate prepared by neutralizing acid whey as is disclosed in U.S. Pat. No. 4,036,999, and the precipitate prepared by adding calcium ion to sweet whey followed by neutralization as disclosed in U.S. Pat. No. 3,560,219 as well as the dried mother liquor remaining after separation of these precipitates. Of these materials, the precipitates prepared in accordance with U.S. Pat. Nos. 3,560,219 and 4,036,999 are preferred, the disclosures of which are incorporated herein by reference.

Also included are other dairy proteins such as casein and the alkali metal caseinate, egg albumen, vegetable proteins such as soy proteins, blood proteins, and the like. These blends can be prepared by dry blending or codrying a liquid blend. Only a small amount of additional non-modified protein (less than 25%) is recommended to avoid diluting the effects of the modified proteins.

While the produce can be dried effectively by itself, it is also contemplated within the scope of the present invention to co-dry the product with drying agents or other functional ingredients. For example, the product of the present invention can be co-dried with milk solids, egg yolks, or replacers or blends thereof along with gums, starch, sugars, proteins including casein and soy, stabilizers, flavorings, bulking agents, emulsifiers and the like materials.

Since thermogelation basically occurs wherein protein molecules, heated to an activation temperature, are in close proximity to cause interaction at that temperature, the thermogelation temperature is related to the protein content of the solution to be gelled. The higher the protein content, the lower the gelation temperature. For example, if a 7½% protein solution of protein modified in accordance with the present invention gels at 65° C., a 6% solution of the same protein may gel at 68° C. The gel strength is also related to protein content.

The aggregation temperature is relatively independent of protein concentration. Aggregation or the initiation of gelation may be the point at which the protein is activated. Activation of the protein is independent of the protein content whereas gelation is dependent on the protein concentration.

The products of the present invention are characterized by providing solutions having reduced thermogelation temperatures at a pH above the isoelectric point. These products can be used as replacement for all or part of the egg albumen in egg albumen products such as macaroons, pasta, meringues, cakes, and other baked goods, meat binders, food analogues and the like. The products of the present invention can also be used to prepare egg analogue compositions, such as that disclosed in U.S. Pat. No. 3,911,144.

Whey proteins have been suggested for use in acidic beverages because of their bland flavor. Acidic beverages are more fully described in U.S. patent application Ser. No. 037,793, the contents of which are hereby incorporated by reference. The use of whey protein in acidic beverages, particularly those which require pasteurization, has been limited due to the possibility of protein precipitation. The acid stability of proteins is increased by the process of the invention at pH's below the isoelectric point of the protein. The use of the compositions of the present invention in model beverage systems containing no sugar show no precipitation of protein whereas the same whey protein concentrate not modified in accordance with the invention does show a precipitation of protein. In sugar containing beverage systems, the sugar helps the stability of the proteins. In numerous cases, beverages prepared from both modified and unmodified proteins showed no precipitation after pasteurization and storage. The present invention can modify non-operable (precipitatable) whey protein concentrate into useful material provided the protein is soluble at the alkaline pH's of the process. Thus, to insure that each lot of whey protein concentrate is operable in the beverage system, treatment of a whey protein solution in accordance with the teaching of the invention can balance the uniformity of the compositions lot to lot relative to the acid stability of the protein.

Liquid acidic beverages and particularly protein fortified acidic beverages are well known in the art. These are specifically disclosed in the application of L. C. Staples, Ser. No. 037,793, filed May 10, 1979 as well as the prior art discussed therein. Liquid acidic beverages can be protein fortified with the composition of the present invention. From about 75% to about 100% by weight of the protein requirement can be provided by compositions of the present invention with the remaining material being supplied by another whey based product.

A liquid acidic beverage can be prepared by dissolving the whey protein material in water and adding thereto a sufficient amount of a food grade acid to decrease the pH to the proper level. The acids usually used in this type of formulation are citric acid or phosphoric acid. If desired, a cold water soluble fumaric acid as disclosed in U.S. Ser. No. 037,793, can also be used. Sufficient amount of acid is used to reduce the final pH within the range of about 3 to 4.

The acidic liquid beverages as prepared in accordance with the present invention can be fortified with whey protein in an amount ranging from about 0.5% to about 5% by weight based on the total weight of the liquid beverage. It is preferred that the protein fortification range from about 1% to about 3%. The actual amount of solids added to the beverage depends on the concentration of whey protein in the whey protein concentrate.

The acidic liquid beverage is normally comprised of water as well as sugar, protein fortifier, acidulant, and flavoring agents. The liquid beverage can also contain natural liquid fruit juices. The beverage can also contain any of the optional flavoring ingredients, flavor enhancers, emulsifiers, coloring ingredients, clouding agents and other ingredients normally used in preparing acidic liquid beverages.

The protein of the present invention can be used in fortifying citrus flavored drinks, including natural orange juice, lemonade, lime, limeade, as well as other flavors such as mango. These drinks can be carbonated or non-carbonated. A typical composition includes about 11% sugar, 88% water, sufficient acidulant to provide the desired pH as well as small quantities of flavoring ingredients.

The invention will be more fully illustrated in the examples which follow.

EXAMPLE 1

A sample of a whey protein concentrate having from about 50% to about 54% protein prepared by the ultrafiltration of clarified cottage cheese whey was solubilized in water to about 12% total solids at room temperature (25° C.). The pH of the solution was about 7. The pH was adjusted to about pH 9.5 by the slow addition (about ten minutes) of 4 normal NaOH under fast stirring. The alkaline protein solution was heated to 60° C. The time to reach 60° C. was 15 minutes. Upon reaching 60° C., the temperature of the solution was reduced to room temperature (25° C.) over a period of 15 minutes with stirring. The pH was adjusted to about 7.0 by adding 4 normal HCl slowly (about ten minutes) under fast stirring. The product was then freeze-dried.

The product of Example 1 was tested for gelation properties and the results were compared to the gelation results obtained using the non-treated whey protein concentrate prepared by the ultrafiltration of cottage cheese whey and commercial dried egg white. The gelation test involved dissolving the test protein in an appropriate quantity of water to obtain the desired percent total solids or percent total protein. The product of the invention and the unmodified whey protein concentrate control were tested in solutions containing 18% total solids and about 9% protein. The egg white control solution, prepared from commercial dried egg white, has 18% total solids and about 14.4% protein. The pH of the solution is adjusted to 7.0 with a minimum amount of acid (HCl) or base (NaOH). Thirty-five grams of solution is weighed into a 35 cm × 45 cm diameter glass dish. The dish is covered with plastic film and a watch glass. The glass dish is lowered into a hot water bath for 30 minutes, from the time the dish is placed into the bath. After 30 minutes, the dish is placed in a refrigerator immediately after heating and held overnight. The gel strength is determined by allowing the temperature of the gel to reach room temperature (25° C., a water bath can be used for this purpose) and then inverting the gel on the scale of a Marine Colloids gel tester (slow speed and small plunger). The amount of force in grams required to break the center of the gel is then determined. The following results were obtained:

TABLE I

| Temperature for Thermogelation Test | Gel Strength (grams) | | |
|---|---|---|---|
| | Product Example 1 | Egg Albumen | Control (Whey Protein Conc.) |
| 65° C. | 75 | 80 | No gelation (liquid) |
| 70° C. | 210 | 220 | Loose and pourable gel |

The light transmittance of 0.2% total solids solutions were measured at 620 nm at pH 3 and 7. The results reported in Table II indicate whether or not the product treated in accordance with the present invention is as soluble as an untreated product. As can be seen from the results in Table II, the product of Example 1 is as soluble as the non-treated control.

TABLE II

| | Light Transmittance % | |
|---|---|---|
| Sample | Product Example 1 | Whey Protein Concentrate (Control) |
| pH 3 | 88% | 82% |
| pH 7 | 84% | 77.5% |

These data show that an untreated whey protein concentrate prepared by the ultrafiltration of cottage whey will not gel at 65° C. or 70° C. whereas egg white and whey protein concentrate treated in accordance with the invention will gel at the same temperature. The treatment of the present invention does not affect the solubility of the product vis-a-vis the control at pH 3 and 7.

EXAMPLE 2

The process of Example 1 was repeated in a pilot plant at pH 9.5 using a high temperature short time pasteurizer at 65° C. for about 20 seconds to provide the heating step. Equivalent results were obtained.

The gelation studies of Example 1 were repeated using the product of Example 2 at 15% total solids (about 7.5% total protein). Two separate samples from two separate lots of whey protein concentrates were prepared and tested against the untreated starting material. The egg albumen control was reconstituted dried egg white at 15% total solids and about 12.0% protein. The results are reported in Table III below:

TABLE III

| | Temperature for Thermogelation Test | | | | |
|---|---|---|---|---|---|
| | 65° C. | 70° C. | 75° C. | 80° C. | 85° C. |
| Sample | Gel Strength (grams) | | | | |
| Control (WPC) | No gel* | No gel* | 192 | 390 | 570 |
| Product Example 2 | 32 | 183 | 300 | 457 | 527 |
| Control (WPC) | No gel* | No gel* | 170 | 330 | 345 |
| Product Example 2 | Loose gel** | 135 | 280 | 385 | 425 |
| Egg Albumen Control | 47 | 93 | 287 | 543 | 673 |

*Liquid
**Not measurable

The light transmittance of the product of Example 2 was measured at pH 3 and 7 using a 0.2% total solids solution at 620 nm. The amount of denaturation was measured by determining percent precipitated protein at pH 4.6. Two samples were prepared using the process of Example 2 and tested. The following results were obtained:

TABLE IV

| | | % Light Transmittance | |
|---|---|---|---|
| Sample | % Denaturation | pH 3 | pH 7 |
| Control (WPC) | 21.9 | 78 | 74.8 |
| Product Example 2 | 73.6 | 83.4 | 80.5 |
| Control (WPC) | 11.0* | 91 | 77.5 |
| Product Example 2 | 69.0* | 87.8 | 87.3 |

*Determined separately on separate initial starting materials

No sedimentation on the bottom of the vessel was observed on standing at room temperature at pH 3 and 7 for both products of Example 2.

As can be seen by reference to the data of Table IV, the products of the invention are essentially denatured as shown by their insolubility at pH 4.6. The products were soluble at pH 3 and 7. These products would effectively gel at 70° C. whereas the untreated whey protein concentrate would not gel.

EXAMPLE 3

The effect of the process of the present invention on lowering the thermogelation temperature of whey proteins on an approximately equal protein basis compared with non-modified they proteins and egg white protein was tested.

A 12% solution of commercial dry egg white was prepared. Since dried egg white has approximately 80% protein, this solution contains approximately 9.6% protein.

Solutions of 50% whey protein concentrate and modified whey protein concentrate were prepared as in Example 1.

The pH levels of each solution was adjusted to about 7, with minimum amounts of NaOH or HCl.

Each solution was gelled by heating for 30 minutes at the temperature given in Table V and tested in accordance with the procedure outlined in Example 1. The results are reported in Table V.

TABLE V

| | % Total Solids | % Protein | Thermo-gelation Temp. °C. | Gel Strength grams | Comments |
|---|---|---|---|---|---|
| Product Invention | 18 | 9 | 65 | 75 | Weak but very good gel |
| WPC (Control) | 18 | 9 | 65 | None | No gelation, liquid |
| Egg White | 12 | 9.6 | 65 | None | Gelled but very loose and pourable |
| Product Invention | 18 | 9 | 70 | 210 | Very good gel |
| WPC (Control) | 18 | 9 | 70 | None | Gelled, very weak, not measurable |
| Egg White | 12 | 9.6 | 70 | None | Very loose gel, not pourable, not measurable |
| Product Invention | 18 | 9 | 75 | 550 | Excellent gel |
| WPC (Control) | 18 | 9 | 75 | 540 | Excellent gel |
| Egg White | 12 | 9.6 | 75 | 100 | Weak but good gel |

These data show that, at approximately the same protein level, the process of the present invention provides a modified whey protein composition which gels at a lower temperature than egg white or unmodified whey protein until the activation energy of the unmodified whey protein is reached. At that point, both the modified and unmodified whey proteins give equivalent results at a 9% protein level.

EXAMPLE 4

The process of the present invention was duplicated using whey protein concentrate from various sources. In each case, a solution with the total solids recorded in Table VI was prepared, the pH adjusted to 9.5, the alkaline solution heated to 60° C. and cooled. The solutions were not dried. The pH of the solutions was adjusted to 7 and the solutions were tested to determine gelation characteristics using the procedure outlined in Example 1. The following results were obtained:

TABLE VI

| WPC Products | % Total Solids | Gel Strength (Gram) at Temperatures Indicated | | | |
|---|---|---|---|---|---|
| | | 70° C. | | 75° C. | |
| | | Un-modified | Modified | Un-Modified | Modified |
| WPC A 60% | 18 | Weak gel* | 215 | Weak gel* | 370 |
| WPC B 86% | 12 | 25 | 325 | 330 | 480 |
| WPC C 80% | 12 | No gelation | Slightly thicker | No gelation | Weak gel |

A - a 60% WPC prepared by ultrafiltration
B - a 86% WPC prepared by Ion Exchange Separation
C - a 80% WPC prepared by ultrafiltration
*not measurable From these data, it can be seen that various whey protein concentrates can be processed in accordance with the teachings of the invention. As the degree of denaturation increases, the gelation properties decrease. Thus, some modified WPC's are more effective than others. A highly denatured product at 12% or 18% total solids and 35% protein prepared by electrodialysis showed no gelation under each concentration at each temperature whether modified or unmodified. Similarly, a WPC at 50% protein prepared by ultrafiltration and denatured by heat is not affected by the process of the invention.

EXAMPLE 5

The effect of heat treating whey protein under alkaline conditions in regard to the acid-heat stability of whey protein in acid beverages was investigated.

An acid beverage (model system) was prepared by forming a 1% protein (2% total solids) solution of the proteins listed in Table VII below. Controls were prepared from the same lot of protein as modified product. The pH was adjusted to 3.5 with citric acid. The solutions were pasteurized at 75° C. for 20 minutes. The solutions were visually inspected after one week storage in a refrigerator including 3 cycles of warming and cooling. A whey protein concentrate modified in accordance with the procedure of Example 1 showed no precipitate upon storage whereas the control of unmodified whey protein concentrate showed a large amount of precipitation. Similar results were achieved using a spray dried product prepared at pH 9.5, 65° C. wherein the heating and cooling was conducted using a pasteurization unit as described in Example 2.

TABLE VII

| Sample | Acid Beverage - Precipitation After Pasteurization and One Week Storage |
|---|---|
| Product of Invention[A] | None |
| Control | Much |
| Product of Invention[B] | None |
| Control | Much |
| Product of Invention[C] | None |
| Control | Much |

[A] separate lot of whey protein concentrate modified as in Example 1
[B] and [C] separate lots of whey protein concentrate modified as in Example 2.

EXAMPLE 6

In order to demonstrate the effect of the process of the present invention on preparing whey protein concentrate products which are operable in an acid beverage, two batches of whey protein concentrates known to cause precipitation in acid beverage systems after pasteurization (this considered failure) were treated in accordance with the present invention. The whey protein concentrate products were prepared by ultrafiltering cottage cheese whey under acidic conditions (pH 3.3) and drying the retentate.

Samples of each batch were modified using the process as outlined in Example 1.

Acidic beverages were prepared using the following formulation:
1.3% protein solution (2.6% solids)
10.04% sugar added (% based on beverage weight)
Acidified with cold water soluble fumaric acid to pH 3.5.

Bottled and pasteurized at 75° C. for 20 minutes. The results are reported in Table VIII as follows:

TABLE VIII

| WPC | Immediately after Pasteurization | After 1 day in refrigerator | After 1 week in refrigerator | After 2 weeks in refrigerator |
|---|---|---|---|---|
| Unmodified | Much pptn | Much pptn | Much pptn | Much pptn |

TABLE VIII-continued

| WPC | Immediately after Pasteurization | After 1 day in refrigerator | After 1 week in refrigerator | After 2 weeks in refrigerator |
|---|---|---|---|---|
| Modified | No pptn | No pptn | No pptn | No pptn |
| Unmodified | Much pptn | Much pptn | Much pptn | Much pptn |
| Modified | No pptn | No pptn | Slight pptn | Slight pptn |

As the data show, the inoperative whey protein concentrate continued to show much precipitation while the same products modified in accordance with the teachings of the present invention showed no precipitation or only a slight precipitation in one sample after one week.

EXAMPLE 7

A whey protein concentrate powder (50% protein) prepared by drying the retentate obtained by ultrafiltering cottage cheese whey was reconstituted in water at 26.3°–35° C. to give a 12% total solids solution. Sodium hydroxide was added to elevate the pH from about neutral to pH 9.5. The solution was heat treated in a pasteurizer at 60° C.–71° C. for 12–16 seconds. The temperature of the sample leaving the pasteurizer was about 54.5° C. The product cooled to 37.8° C. within 30 minutes. The pH was adjusted to 7 with hydrochloric acid. The product was spray dried. A fine, low bulk density product was obtained.

EXAMPLE 8

Studies were conducted to determine the effect of processing egg albumen and whey protein concentrate together in accordance with the process of the invention. Samples were prepared at two total solids levels, i.e., 10% and 12% total solids. A 1:1 by weight blend of whey protein concentrate (50% protein) and dried egg albumen (80% protein) provides 6.5% protein in a 10% solution and 7.8% in a 12% solution. Egg albumen and modified egg albumen controls provided 8% and 9.6% protein in 10% and 12% total solids solutions, respectively. Whey protein concentrate controls provided 5% and 6% protein in 10% and 12% solutions, respectively.

All samples of modified products were prepared using the procedure of Example 1 using 65° C. with the exception of the modified whey protein concentrate control which was prepared in accordance with the procedure of Example 2.

All gelation tests were performed using the procedure as outlined in Example 1.

The gelation results of the modification at various gelation temperatures at 10% and 12% total solids as compared to corresponding controls are reported in the tables below:

TABLE IX

| | 10% Total Solids | |
|---|---|---|
| Gelation Conditions 65° C./30 min. | Gel Strength Grams | Texture |
| Sample | | |
| Modified 1:1 Blend Egg Albumen/WPC[A] | * | Pourable Gel |
| Non-modified 1:1 Blend Egg Albumen/WPC[A] | * | Liquid |
| Modified WPC[B] | * | Liquid |
| Non-modified WPC[A] | * | Liquid |
| Modified Egg Albumen | 30 | Very weak |

TABLE IX-continued

| | 10% Total Solids | |
|---|---|---|
| Gelation Conditions 65° C./30 min. | Gel Strength Grams | Texture |
| Non-modified Egg Albumen | * | Pourable Gel |

[A]WPC is 50% whey protein concentrate
[B]Modified by process of Example 2
*Not measurable

TABLE X

| | 10% Total Solids | |
|---|---|---|
| Gelation Conditions 70° C./30 min. | Gel Strength Grams | Texture |
| Sample | | |
| Modified 1:1 Blend Egg Albumen/WPC[A] | * | Not Pourable Gel |
| Non-modified 1:1 Blend Egg Albumen/WPC[A] | * | Pourable Gel |
| Modified WPC[B] | * | Liquid |
| Non-modified WPC[A] | * | Liquid |
| Modified Egg Albumen | 50 | Very weak |
| Non-modified Egg Albumen | * | Not Pourable Gel |

[A]WPC is 50% whey protein concentrate
[B]Modified by process of Example 2
*Not measurable

TABLE XI

| | 10% Total Solids | |
|---|---|---|
| Gelation, Conditions 75° C./30 Min. | Gel Strength Grams | Texture |
| Sample | | |
| Modified 1:1 Blend Egg Albumen/WPC[A] | 80 | Weak |
| Non-modified 1:1 Blend Egg Albumen/WPC[A] | 20 | Very weak |
| Modified WPC[B] | * | Pourable Gel, Better than WPC control |
| Non-modified WPC[A] | * | Pourable Gel |
| Modified Egg Albumen | 140 | Weak |
| Non-modified egg albumen | 50 | Very weak |

[A]WPC is 50% whey protein concentrate
[B]Modified by process of Example 2
*Not measurable

TABLE XII

| | 10% Total Solids | |
|---|---|---|
| Gelation, Conditions 80° C./30 Min. | Gel Strength Grams | Texture |
| Sample | | |
| Modified 1:1 Blend Egg Albumen/WPC[A] | 140 | Weak |
| Non-modified 1:1 Blend Egg Albumen/WPC[A] | 50 | Very weak |
| Modified WPC[B] | 80 | Weak |
| Non-modified WPC[A] | 40 | Very weak |
| Modified egg albumen | 240 | Very good |
| Non-modified egg albumen | 110 | Weak |

[A]WPC is 50% whey protein concentrate
[B]Modified by process of Example 2

TABLE XIII

| | 10% Total Solids | |
|---|---|---|
| Gelation Conditions 85° C./30 min. | Gel Strength Grams | Texture |
| Sample | | |
| Modified 1:1 Blend Egg Albumen/WPC[A] | 170 | Good |
| Non-modified 1:1 Blend Egg Albumen/WPC[A] | 60 | Very weak |
| Modified WPC[B] | 120 | Weak |

TABLE XIII-continued

| | 10% Total Solids | |
|---|---|---|
| Gelation Conditions 85° C./30 min. | Gel Strength Grams | Texture |
| Non-modified WPC[A] | 90 | Weak |
| Modified Egg Albumen | 280 | Excellent |
| Non-modified Egg Albumen | 130 | Weak |

[A]WPC is 50% whey protein concentrate
[B]Modified by process of Example 2

TABLE XIV

| | 12% Total Solids | |
|---|---|---|
| Gelation, Conditions 65° C./30 Min. | Gel Strength Grams | Texture |
| Sample | | |
| Modified 1:1 Blend Egg Albumen/WPC[A] | * | Pourable gel, Similar to Egg Albumen Control |
| Non-modified 1:1 Blend Egg Albumen/WPC[A] | * | Pourable Gel, Poorer Egg Albumen Control |
| Modified WPC[B] | * | Pourable Gel, Similar to Egg Albumen Control |
| Non-modified WPC[A] | * | Liquid |
| Modified Egg Albumen | 40 | Very weak gel |
| Non-modified egg albumen | * | Pourable gel |

[A]WPC is 50% whey protein concentrate
[B]Modified by process of Example 2
*Not measurable

TABLE XV

| | 12% Total Solids | |
|---|---|---|
| Gelation Conditions 70° C./30 min. | Gel Strength Grams | Texture |
| Sample | | |
| Modified 1:1 Blend Egg Albumen/WPC[A] | 50 | Weak Gel |
| Non-modified 1:1 Blend Egg Albumen/WPC[A] | * | Pourable Gel |
| Modified WPC[B] | 50 | Weak Gel |
| Non-modified WPC[A] | * | Liquid |
| Modified Egg Albumen | 70 | Weak Gel |
| Non-modified Egg Albumen | 20 | Very weak, non-pourable |

[A]WPC is 50% whey protein concentrate
[B]Modified by process of Example 2
*Not measurable

TABLE XVI

| | 12% Total Solids | |
|---|---|---|
| Gelation Conditions 75° C./30 min. | Gel Strength Grams | Texture |
| Sample | | |
| Modified 1:1 Blend Egg Albumen/WPC[A] | 160 | Weak Gel |
| Non-modified 1:1 Blend Egg Albumen/WPC[A] | 40 | Very weak Gel |
| Modified WPC[B] | 150 | Weak gel |
| Non-modified WPC[A] | 90 | Weak gel |
| Modified Egg Albumen | 180 | Weak gel |
| Non-modified Egg Albumen | 120 | Weak gel |

[A]WPC is 50% whey protein concentrate
[B]Modified by process of Example 2

TABLE XVII

| | 12% Total Solids | |
|---|---|---|
| Gelation Conditions 80° C./30 min. | Gel Strength Grams | Texture |
| Sample | | |
| Modified 1:1 Blend Egg Albumen/WPC[A] | 230 | Very good gel |
| Non-modified 1:1 Blend Egg Albumen/WPC[A] | 100 | Weak gel |
| Modified WPC[B] | 170 | Good gel |
| Non modified WPC[A] | 160 | Good Gel |
| Modified Egg Albumen | 310 | Very good gel |
| Non modified Egg Albumen | 180 | Good Gel |

[A]WPC is 50% whey protein concentrate
[B]Modified by process of Example 2

TABLE XVIII

| | 12% Total Solids | |
|---|---|---|
| Gelation Conditions 85° C./30 min. | Gel Strength Grams | Texture |
| Sample | | |
| Modified 1:1 Blend Egg Albumen/WPC[A] | 280 | Very good gel |
| Non-modified 1:1 Blend Egg Albumen/WPC[A] | 120 | Weak gel |
| Modified WPC[B] | 220 | Very good gel |
| Non-modified WPC[A] | 210 | Very good gel |
| Modified Egg Albumen | 380 | Very good gel |
| Non modified Egg Albumen | 230 | Very good gel |

[A]WPC is 50% whey protein concentrate
[B]Modified by process of Example 2

From these data, it can be seen that the unmodified blend of whey protein concentrate and egg albumen has a lower gelation strength than the modified blend. The gelation strength of the modified blend is greater than the gel strength of egg albumen and even greater than the gel strength of modified whey protein concentrate. In some instances, the gelation strength of the blend is less than obtained by unmodified whey protein concentrate even though the blend has more protein.

Since the protein concentration has a significant effect on the gelation strength, the product of gels at low protein content (10% total solids) clearly shows the effect of the process of the invention on the improvement of gel strength. This is particularly true since the whey protein concentrate example has only about 5% protein whereas the egg albumen example has 8% protein. Protein content of the blends is in between those two figures.

What is claimed is:

1. A process for preparing a blend of egg albumen and a dairy whey protein product characterized by a reduction in the temperature required for the onset of thermogelation of a solution having a pH above the isoelectric point, said process comprising (a) adjusting the pH to a range of from about 7.5 to about 10 of an aqueous solution containing from about 0.5% to about 20% on a protein basis of a blend comprising from about 1% to about 99% egg albumen and from about 99% to about 1% by weight based on the total dry weight of said blend of dairy whey protein capable of being thermogelled through the formation of disulfide linkages under the influence of heat, said solution having a temperature of less than 30° C., (b) heating the alkaline solution of step (a) to an elevated temperature within the range of from about 50° C. up to the gelation temperature of said solution at a rate insufficient to cause gelation of said solution, said heating being carried out for a time effective to impart to said product a reduced thermogelation temperature; and (c) cooling said heated solution to a temperature within the range of from about 30° C. to about 2° C. within 60 minutes after the said solution reaches its maximum temperature level, said cooling being conducted at a rate sufficient to prevent gelation of said protein containing solution, said processed blend providing a solution having a gel strength greater than a blend of unprocessed protein.

2. The process of claim 1 wherein the pH of the solution is reduced to a pH within the range of from about 6 to about 7.5 simultaneously with or subsequent to cooling.

3. The process of claim 1 wherein said cooling is initiated less than 15 minutes after the solution has reached its maximum temperature level.

4. The process of claim 1 wherein said cooling is conducted at a rate sufficient to lower the temperature to the range of from about 2° C. to about 30° C. within about 15 minutes after initiating cooling.

5. The process of claim 1 wherein said egg albumen is used in an amount of from about 25% to about 75%.

6. The product produced by the process of claim 1.

* * * * *